Sept. 20, 1955  R. V. LATSHAW  2,718,164
PLIER TYPE TOOL FOR ADJUSTING WIRE CLIPS
Filed March 19, 1953
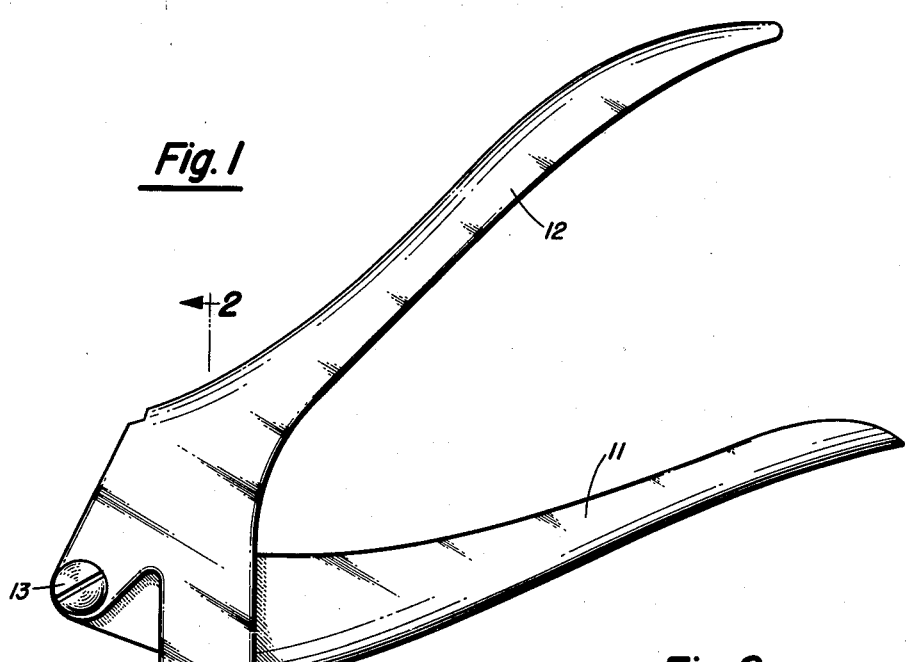
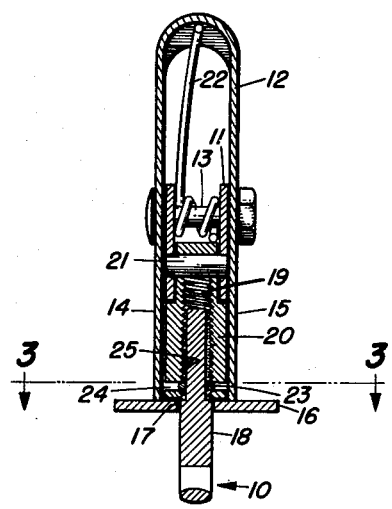
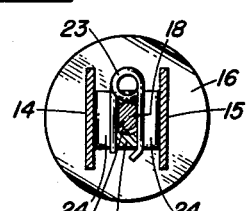
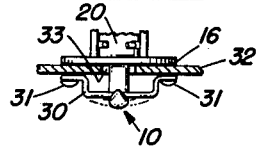
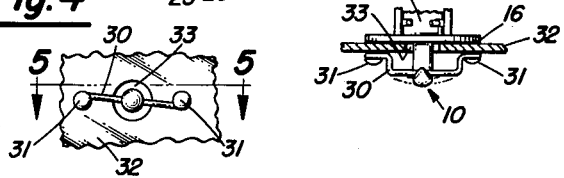
INVENTOR.
Robert V. Latshaw
BY
Attorneys

United States Patent Office 2,718,164
Patented Sept. 20, 1955

2,718,164

PLIER TYPE TOOL FOR ADJUSTING WIRE CLIPS

Robert V. Latshaw, Alameda, Calif., assignor to the United States of America as represented by the Secretary of the Navy Application March 19, 1953, Serial No. 343,533

6 Claims. (Cl. 81—5.1)

(Granted under Title 35, U. S. Code (1952), sec. 266)

The invention described herein may be manufactured and used by or for the Government of the United States of America for governmental purposes without the payment of any royalties thereon or therefor.

This invention relates to a hand tool which is particularly adapted for the adjustment of spring wires of the type to which snap-on fasteners, such as Dzus fasteners, can be secured.

The type of fasteners referred to are employed to secure sheet metal to frame members in those instances where frequent removal of the sheet metal is necessitated. For example, this type of fastener is used for the attachment of the cowling to the engine frame members of most aircraft thereby facilitating removal of the cowling when engine repair is required and replacement thereof when the engine mechanics have completed their work.

The Dzus fastener which is predominantly utilized in the aircraft industry comprises a cylindrical body member having an enlarged flattened head at one end and a diametral slot at its other end which slot merges into lateral and diametrically opposed slots extending arcuately from the innermost end of the diametral slot approximately 90°. The cylindrical body of the fastener is adapted to pass through aligned openings in the cowling and the engine frame member so that the diametral slot can straddle a spring-wire which is fastened at its ends to the rear face of the frame member so as to span the opening therein. When fully inserted, the fastener is manually rotated 90° so that the spring-wire is received in the arcuate slots and holds the head of the fastener yieldably against the cowling whereby the latter is secured against the frame member of the aircraft. Reverse rotation of the fastener against the frictional force between the spring-wire and the arcuate slots will permit withdrawal of the fastener whereupon the cowling becomes disconnected from the frame member and can be removed.

It will be apparent that unless the spring wire is precisely positioned, the fastener will not be able to hold the cowling firmly against the engine frame member. Frequently during the manufacture and assembly of the aircraft, the spring wire, when it spans the opening through which the fastener enters, is positioned at too great or small a distance from the rear side of the frame member, such positions being referred to as a setting of too great or too little depth, as the case may be. Repeated removal and reinsertion of the fastener also causes a setting of excessive depth to eventuate since the fastener can be inserted inadvertently at the wrong angle so that the diametral slot does not straddle the wire but instead the base of the body member of the fastener is pressed against the spring wire to displace the same.

Considerable difficulty has been experienced in adjusting the position of the spring wires which in one way or another have been displaced so as to be ineffective as the base for connection of the fastener. Particularly, spring-wires which are at too deep a setting can not be easily adjusted since the rear side of the frame member to which the wire is secured is frequently not directly accessible but can be reached only through the opening spanned by the wire.

It is an object of the present invention, therefore, to provide a hand tool adapted to enable the quick and precise adjustment of spring-wires of the type referred to hereinabove.

In accordance with the invention, a hook is provided for engagement of the spring-wire and this hook is arranged for actuation in a manner such that the engaged spring-wire is moved into the desired position with utmost expedience.

Other object and many of the attendant advantages of this invention will be appreciated as the same becomes better understood by reference to the following detailed description when considered in connection with the accompanying drawing wherein:

Fig. 1 is a side elevation of a hand tool constituting a preferred embodiment of the invention;

Fig. 2 is a vertical sectional view taken along line 2—2 of Fig. 1;

Fig. 3 is a sectional view taken along line 3—3 of Fig. 2;

Fig. 4 is a plan view of a spring-wire of the type referred to under operative engagement by the hand tool of the preceding figures; and Fig. 5 is a sectional view taken along line 5—5 of Fig. 4.

As shown in the drawing, the wire-engaging hook, generally designated at 10 is connected to one handle 11 of an actuating mechanism including a second handle 12 pivoted as shown at 13 to the first at its extremity after the fashion of an ordinary paper punch or like hand tool.

The handles 11 and 12 are roughly U-shaped in cross-section and appropriately curved longitudinally so as to present a comfortable hand grip to the operator. Rigid parallel straps 14, 15 are formed as integral projections from the side portions of the upper U-shaped handle 12 near the pivot point 13, as viewed in Fig. 1, and pass downwardly beyond opposite sides of the lower handle 11 to mount a circular plate or disc 16 in bridging relation at their lower ends in the manner of a stirrup. A central aperture 17 in the disc 16 loosely receives a cylindrical rod 18 which is machined at its lower end to form the wire-engaging hook 10, mentioned hereinbefore. The rod 18 is threaded at its upper end so that it may be adjustably secured within the threaded bore 19 of a mounting block 20 pivoted on a pin 21 extending transversely between the sides of the lower handle 11 at a point such that the block is suspended intermediately of the straps 14, 15. The base of the block 20 is yieldably held against the upper surface of the disc 16 by a spring 22 arranged in a conventional manner to urge the two handles 11, 12 apart, as shown in Fig. 2. With the block 20 so positioned, the rod 18 threadedly suspended therefrom will be disposed with its hook 10 at a predetermined distance beneath the disc 16 and when the handles 11, 12 are squeezed together against the opposition of the spring 22, the hook 10 is caused to move relatively closer to the disc 16.

The distance between the hook 10 and the disc 16 is easily adjusted by manual rotation of the rod 18 so that it enters the threaded bore 19 of the mounting block 20 a greater or lesser amount. To restrain accidental rotation of the rod 18 during use of the tool and thus maintain the desired distance between the hook and the disc, a spring detent is provided. As shown in Figs. 2 and 3, a small wire spring 23 is arranged within transverse slots 24 in the mounting block 20 so as to yieldably engage opposite points on the rod 18, and the latter is flattened on opposite sides as shown at 25. When the spring 23 is pressed against the flattened portions 25 of the rod 18, a torque of an amount determined by the spring strength is required to effect rotation of the rod. The spring 23 is selected so that engagement of the rod 18 with a spring-wire to be adjusted will be insufficient to cause accidental rotation thereof.

Operation

In Figs. 4 and 5 illustrating the operation of the spring-wire adjusting tool, a typical spring-wire 30 is shown fixed by rivets 31 to the rear face of a member 32 which can be a portion of an engine frame and the wire 30 spans the circular opening 33 in the member which opening admits the body portion of a Dzus fastener for connection to the spring-wire as previously explained.

If the setting of the spring-wire 30 has become too deep, as indicated by phantom lines in Fig. 5, the adjusting tool can be employed to quickly restore the wire to its proper setting, as shown in full lines. The rod 18 of the tool is inserted into the opening 33 in the frame member 32 and the hook 10 on its end is placed rearwardly of the wire 30 and the disc 16 is brought flatly against the fore side of the frame member. The handles 11, 12 are then squeezed to cause movement of the hook 10 toward the disc 16 whereby the spring-wire 30 is pulled into the desired position. The rod 18 is adjusted in the described fashion so that the correct position of the spring wire 30 is reached at the moment of full closure of the handles. With no further adjustment of the rod 18 in the mounting block 20, the remainder of the spring-wires on the engine frame can likewise be pulled to their proper positions. Since the pull exerted on a wire is substantially rectilinear and axial of the opening 33 in the frame member 32, no force is applied to cause any lateral movement of the wire 30 relative to the opening and the lateral relationship therefore remains constant.

In the described manner, each of a series of spring-wires can be quickly adjusted to the precise position desired with no special skill required of the operator and the Dzus fasteners can then be inserted with full assurance that a secure base for their connection is provided.

Obviously many modifications and variations of the present invention are possible in the light of the above teachings. It is therefore to be understood that within the scope of the appended claims the invention may be practiced otherwise than as specifically described.

What is claimed is:

1. A spring-wire adjusting tool comprising a pair of pivotally connected handles, means extending from one handle past the other handle, a plate secured to said means and having an opening therein, and a rod pivotally supported from the other of said handles so as to extend through the opening in said plate and to reciprocate in a path substantially at right angles to said plate upon actuation of said pivotally connected handles, said rod having a hook formed at its extremity adapted to engage a spring-wire to be adjusted.

2. A spring-wire adjusting tool comprising a pair of pivotally connected handles, means extending from one handle past the other handle, a plate secured to said means so as to intersect rectangularly the plane defined by said handles and having a central opening therein, and a rod supported from the other of said handles to pivot about an axis parallel to the pivot axis of said handles so as to extend through the opening in said plate and to reciprocate in a path substantially at right angles to said plate upon actuation of said pivotally connected handles, said rod having a hook formed at its extremity adapted to engage a spring-wire to be adjusted.

3. A spring-wire adjusting tool comprising a pair of pivotally connected handles, means extending from one handle past the other handle, a plate secured to said means and having an opening therein, a rod pivotally supported from the other of said handles so as to extend through the opening in said plate and to reciprocate in a path substantially at right angles to said plates upon actuation of said pivotally connected handles, said rod being so supported from said other of said handles that said rod is pre-set at a predetermined distance from the axis of its pivotal support, said rod having a hook formed at its extremity adapted to engage a spring-wire to be adjusted, means for limiting to a predetermined amount the angular displacement of said handles relative to one another, and spring means yieldably urging said handles apart said predetermined amount whereby to effect a predetermined extension of said rod through the opening in said plate.

4. A spring-wire adjusting tool comprising a pair of pivotally connected handles, means extending from one handle past the other handle, a plate secured to said means and having an opening therein, a member pivotally supported from the other of said handles, and a rod adjustably connected to said member so as to extend through the opening in said plate and to reciprocate in a path substantially at right angles to said plate upon actuation of said pivotally connected handles, said rod having a hook at its extremity adapted to engage a spring-wire to be adjusted.

5. A spring-wire adjusting tool comprising a pair of pivotally connected handles, means extending from one handle past the other handle, a plate secured to said means and having an opening therein, a member pivotally supported from the other of said handles and having a threaded bore adapted to align axially with the opening in said plate, and a rod threaded for adjustable support within the bore of said member so as to extend through the opening in said plate and to reciprocate in a path substantially at right angles to said plate upon actuation of said pivotally connected handles, said rod having a hook at its extremity to engage a spring-wire to be adjusted.

6. A spring-wire adjusting tool comprising a pair of pivotally connected handles, means extending from one handle past the other handle, a plate secured to said means and having an opening therein, a member pivotally supported from the other of said handles and having a threaded bore adapted to align axially with the opening in said plate, a rod threaded for adjustable support within the bore of said member so as to extend through the opening in said plate and to reciprocate in a path substantially at right angles to said plate upon actuation of said pivotally connected handles, said rod having a hook at its extremity adapted to engage a spring-wire to be adjusted and also having diametrically-opposed flattened portions, and spring means engaging said pivotally supported member to restrain rotation of said spring means and also the opposed flattened portions of said rod thereby to yieldably restrain rotation thereof.

References Cited in the file of this patent
UNITED STATES PATENTS

| | | |
|---|---|---|
| 1,427,893 | Babcock | Sept. 5, 1922 |
| 1,629,953 | Foote | May 24, 1927 |
| 1,812,682 | Brickle et al. | June 30, 1931 |